United States Patent
Marimuthu

(10) Patent No.: US 11,115,213 B1
(45) Date of Patent: Sep. 7, 2021

(54) THWARTING ONE-TIME PASSWORD THEFT

(71) Applicant: NortonLifeLock Inc., Tempe, AZ (US)

(72) Inventor: Venkadesan Marimuthu, Chennai (IN)

(73) Assignee: NORTONLIFELOCK INC., Tempe, AZ (US)

( * ) Notice: Subject to any disclaimer, the term of this patent is extended or adjusted under 35 U.S.C. 154(b) by 0 days.

(21) Appl. No.: 16/774,695

(22) Filed: Jan. 28, 2020

(51) Int. Cl.
*H04L 29/06* (2006.01)
*H04L 9/32* (2006.01)
*H04L 9/08* (2006.01)
*G06F 21/42* (2013.01)

(52) U.S. Cl.
CPC ............ *H04L 9/3228* (2013.01); *G06F 21/42* (2013.01); *H04L 9/0825* (2013.01); *H04L 63/0838* (2013.01); *H04L 2463/082* (2013.01)

(58) Field of Classification Search
CPC . H04L 9/3228; H04L 9/0825; H04L 63/0838; H04L 2463/082; G06F 21/42
See application file for complete search history.

(56) References Cited

U.S. PATENT DOCUMENTS

| | | | |
|---|---|---|---|
| 10,182,048 B1 | 1/2019 | Sabanayagam | |
| 10,454,921 B1* | 10/2019 | Chen | H04L 63/0428 |
| 2008/0103984 A1* | 5/2008 | Choe | G06Q 20/3821 |
| | | | 705/76 |
| 2008/0276098 A1* | 11/2008 | Florencio | G06F 21/46 |
| | | | 713/183 |
| 2008/0313297 A1* | 12/2008 | Heron | H04L 51/38 |
| | | | 709/207 |
| 2010/0115289 A1* | 5/2010 | Han | H04L 9/08 |
| | | | 713/189 |
| 2016/0218860 A1* | 7/2016 | Murray | H04L 9/065 |
| 2017/0173476 A1* | 6/2017 | Schindler | A63F 13/71 |
| 2018/0295105 A1* | 10/2018 | Feng | H04W 4/80 |
| 2019/0089544 A1* | 3/2019 | Yang | H04L 9/321 |

OTHER PUBLICATIONS

U.S. Appl. No. 16/127,164, filed Sep. 10, 2018, titled: "Thwarting Potentially Malicious Online Activity"; 30 pages.
Federal Trade Commission Consumer Information; "Identity Theft Protection Services"; Mar. 2016; located at: https://www.consumer.ftc.gov/articles/0235-identity-theft-protection-services; 40 pages.
Sumathy et al.; "OTP Encryption Techniques in Mobiles for Authentication and Transaction Security"; published in International Journal of Innovative Research in Computer and Communication Engineering, vol. 2, Issue 10; Oct. 2014; 10 pages.
MAKETECHEASIER.com; "5 Great SMS Apps for Android that Offer Privacy Options"; Website; located at: https://www.maketecheasier.com/sms-apps-for-android-with-privacy-options/; Dec. 8, 2015; 3 pages.
Singh et al.; "Secure End-To-End Authentication for Mobile Banking"; Software Engineering in Intelligent Systems, Advances in Intelligent Systems and Computing 349; Jan. 2015; DOI: 10.1007/978-3-319-18473-9_22; 10 pages.

* cited by examiner

*Primary Examiner* — Thaddeus J Plecha
(74) *Attorney, Agent, or Firm* — Maschoff Brennan

(57) ABSTRACT

Thwarting one-time password (OTP) theft. In one embodiment, a method may include receiving, at a messaging application executing on the mobile device, a text message from a website that includes an original OTP. The method may also include encrypting, by the messaging application, the original OTP included in the text message to thwart theft of the original OTP from the text message.

19 Claims, 5 Drawing Sheets

Dear Customer, 683850 is your secret OTP (One-Time Password) to authenticate your login to Website X.

Original Text Message

Dear Customer, 847386 is your secret OTP (One-Time Password) to authenticate your login to Website X.

Encrypted Text Message

Dear Customer, 847386 is your secret OTP (One-Time Password) to authenticate your login to Website X.

Encrypted Text Message

FIG. 2B

Dear Customer, 683850 is your secret OTP (One-Time Password) to authenticate your login to Website X.

Original Text Message

FIG. 2A

THWARTING ONE-TIME PASSWORD THEFT

BACKGROUND

A one-time password (OTP) may be a password that is valid only once, such as for only one login session or one transaction on a website. An OTP is often used by a website in connection with two-factor authentication by being sent to a user's mobile device in a text message. Unlike a conventional static password that can be reused multiple times, an OTP can only be used once, after which the OTP becomes invalid.

Unfortunately, however, where an OTP is sent by a website to a user's mobile device in a text message, a malicious actor may attempt to steal the OTP and use it without the user's authorization. For example, a malicious actor may trick a user into sharing the text message containing the OTP by means of voice phishing (e.g., pretending to be calling from user's bank). In another example, a malicious actor may use a malware application (app) that was maliciously installed on the user's mobile device to read the text message containing the OTP and to send the OTP to the malicious actor without the user's knowledge. In another example, a malicious actor may look over the user's shoulder (e.g., shoulder surfing) to see the text message containing the OTP on the user's mobile device, which may appear on a display of the user's mobile device upon receipt even when the user's mobile device is locked.

Thus, a text message containing an OTP sent by a website may be stolen by a malicious actor, which may allow the malicious actor to maliciously log in to the website or to maliciously conduct a transaction on the website. In this manner, a stolen OTP may allow the malicious actor to gain unauthorized access to the website, or make unauthorized use of the website, thereby hindering or preventing the website from offering legitimate online activities for users, or hindering or preventing users from performing legitimate online activities on the website.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for thwarting one-time password (OTP) theft may be performed, at least in part, by a mobile device including at least one processor. The method may include receiving, at a messaging application executing on the mobile device, a text message from a website that includes an original OTP. The method may also include encrypting, by the messaging application, the original OTP included in the text message to thwart theft of the original OTP from the text message. The method may further include storing, by the messaging application, the text message including the encrypted OTP. The method may also include detecting, at an OTP plugin application, entry of the encrypted OTP into a website loaded into a browser application. The method may further include decrypting, by the OTP plugin application, the encrypted OTP to reveal the original OTP. The method may also include replacing, by the OTP plugin application, the encrypted OTP with the original OTP prior to submission of the original OTP to the website.

In some embodiments, the messaging application may be a custom messaging application configured to handle all incoming text messages received at the mobile device.

In some embodiments, the encrypting of the original OTP may include encrypting the original OTP with a format preserving encryption algorithm. In these embodiments, the format preserving encryption algorithm may be configured to cause the encrypted OTP to have the same number of characters as the original OTP.

In some embodiments, the encrypting of the original OTP may include generating, by the messaging application, an asymmetric key pair including a private key and a public key, storing, at the mobile device, the private key, sending, from the messaging application to the OTP plugin application, the public key, generating, by the OTP plugin application, an original session key, encrypting, by the OTP plugin application, the original session key using the public key, sending, from the OTP plugin application to the messaging application, the encrypted session key, decrypting, by the messaging application, the encrypted session key using the stored private key to reveal the original session key, and encrypting, by the messaging application, the original OTP using the original session key. In these embodiments, the public key and the encrypted session key may be sent via a first server that is different from a second server that hosts the website.

In some embodiments, the replacing of the encrypted OTP with the original OTP may include automatically filling in a form field of the website, into which the encrypted OTP was entered, with the original OTP.

In some embodiments, a computer-implemented method for thwarting one-time password (OTP) theft may be performed, at least in part, by a mobile device including at least one processor. The method may include receiving, at a messaging application executing on the mobile device, a text message from a website that includes an original OTP. The method may also include encrypting, by the messaging application, the original OTP included in the text message to thwart theft of the original OTP from the text message. The method may further include storing, by the messaging application, the text message including the encrypted OTP.

In some embodiments, the messaging application may be a custom messaging application configured to handle all incoming text messages received at the mobile device.

In some embodiments, the encrypting of the original OTP may include encrypting the original OTP with a format preserving encryption algorithm. In these embodiments, the format preserving encryption algorithm may be configured to cause the encrypted OTP to have the same number of characters as the original OTP.

In some embodiments, the encrypting of the original OTP may include generating, by the messaging application, an asymmetric key pair including a private key and a public key, storing, at the mobile device, the private key, sharing, by the messaging application, the public key, receiving, at the messaging application, an encrypted session key that was encrypted using the public key, decrypting, by the messaging application, the encrypted session key using the stored private key to reveal an original session key, and encrypting, by the messaging application, the original OTP using the original session key. In these embodiments, the public key and the encrypted session key may be sent via a first server that is different from a second server that hosts the website.

In some embodiments, the text message may be a Short Message Service (SMS) text message.

In some embodiments, a computer-implemented method for thwarting one-time password (OTP) theft may be performed, at least in part, by a network device including at least one processor. The method may include detecting, at an OTP plugin application executing on the network device, entry of an encrypted OTP into website loaded into a browser application executing on the network device. The method may also include decrypting, by the OTP plugin application, the encrypted OTP to reveal an original OTP. The method may further include replacing, by the OTP plugin application, the encrypted OTP with the original OTP prior to submission of the original OTP to the website.

In some embodiments, the encrypted OTP may have been encrypted with a format preserving encryption algorithm. In these embodiments, the format preserving encryption algorithm may be configured to cause the encrypted OTP to have the same number of characters as the original OTP.

In some embodiments, the encrypted OTP may have been encrypted using a session key that was generated by the OTP plugin application.

In some embodiments, the replacing of the encrypted OTP with the original OTP may include automatically filling in a form field of the website, into which the encrypted OTP was entered, with the original OTP.

In some embodiments, the network device may be a mobile device at which a text message from the website that includes the original OTP is received.

In some embodiments, one or more non-transitory computer-readable media may include one or more computer-readable instructions that, when executed by one or more processors, cause the one or more processors to perform a method for thwarting one-time password (OTP) theft.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which:

FIG. 2A illustrates an original text message that contains an original OTP;

FIG. 2B illustrates the original text message of FIG. 2A after having been converted into an encrypted text message, with the original OTP having been replaced with an encrypted OTP;

DETAILED DESCRIPTION

A one-time password (OTP) may be a password that is valid for only one login session or transaction on a website, and may be used by a website in connection with two-factor authentication by being sent to a user's mobile device in a text message. Unfortunately, however, where an OTP is sent by a website to a user's mobile device in a text message, a malicious actor may attempt to steal the OTP and then use it without the user's authorization. For example, a malicious actor may access the OTP contained in a text message using voice phishing, using a malware application (app) installed on the user's mobile device, or using shoulder surfing. Thus, a text message containing an OTP sent by a website may be stolen by a malicious actor, which may allow the malicious actor to maliciously log in to the website or to maliciously conduct a transaction on the website. In this manner, a stolen OTP may allow the malicious actor to gain unauthorized access to the website, or make unauthorized use of the website, thereby hindering or preventing the website from offering legitimate online activities for users, or hindering or preventing users from performing legitimate online activities on the website.

Some embodiments disclosed herein may thwart OPT theft. For example, when a website sends an original OTP in a text message to a user's mobile device (e.g., the user's smartphone), a messaging application executing on the user's mobile device may encrypt the original OTP included in the text message to thwart theft of the original OTP from the text message, and then store the text message including the encrypted OTP. Later, when the encrypted OTP is entered into a browser of the user's network device (e.g., the user's laptop), an OTP plugin application executing on the user's network device may detect entry of the encrypted OTP, may decrypt the encrypted OTP to reveal the original OTP, and may replace the encrypted OTP with the original OTP prior to submission of the original OTP to the website. In this manner, the original OTP may be encrypted upon receipt by the user's mobile device (e.g., the user's smartphone) to prevent the original OTP from being stolen by a malicious actor. Further, even if the encrypted OTP received by the user's mobile device (e.g., the user's smartphone) is stolen by a malicious actor (e.g., using voice phishing, using a malware application (app), or using shoulder surfing), the encrypted OTP can not be used to maliciously log in to the website or to maliciously conduct a transaction on the website unless the encrypted OTP is entered in to the user's network device (e.g., the user's laptop), to which the malicious actor is unlikely to have access. Thus, by preventing theft of the original OTP by a malicious actor, some embodiments disclosed herein may prevent the malicious actor from gaining unauthorized access to the website by logging in to the website or by maliciously conducting a transaction on the website.

Figure 1:
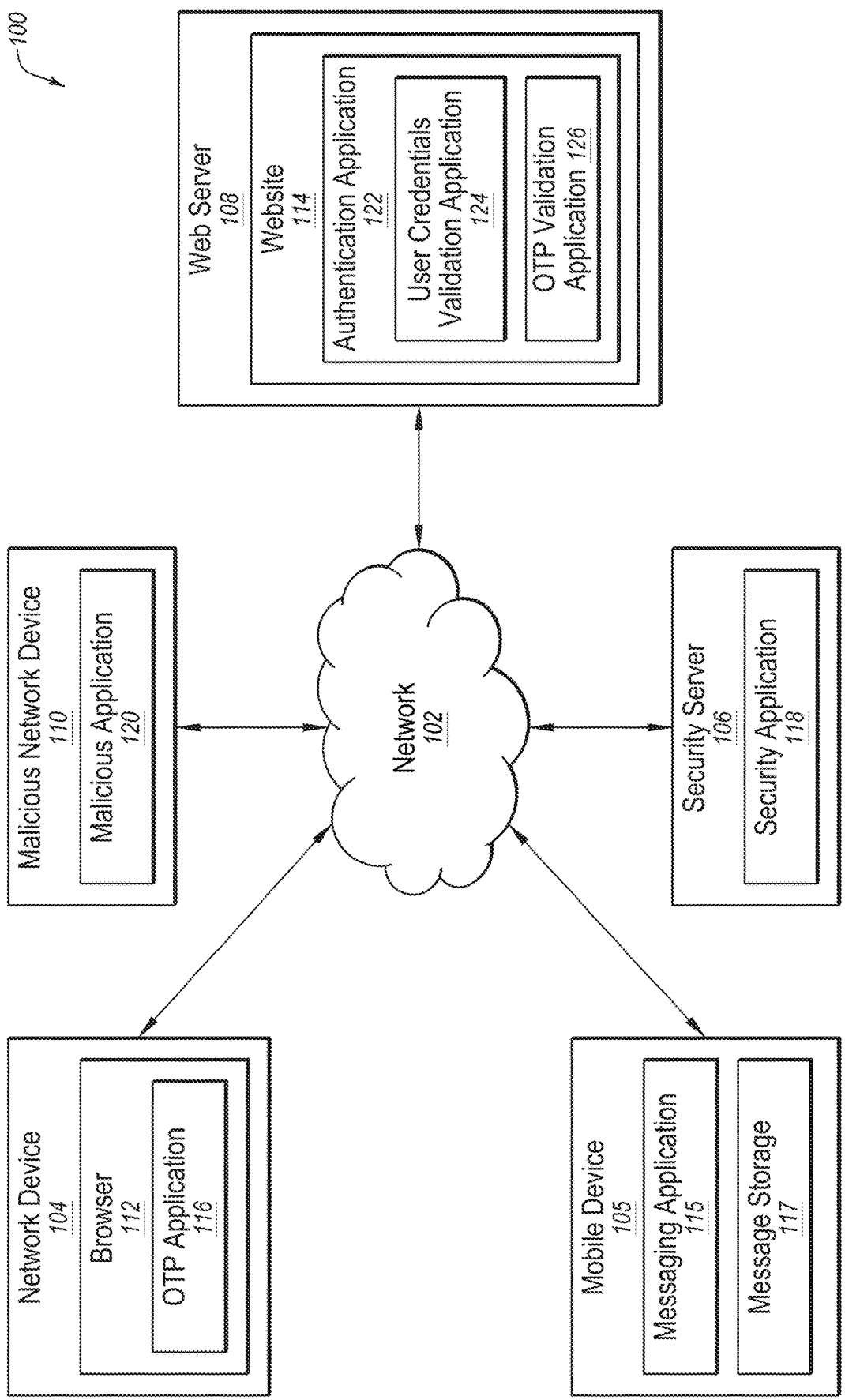
FIG. 1 illustrates an example system configured for thwarting one-time password (OTP) theft.

Turning to the figures, FIG. 1 illustrates an example system 100 configured for thwarting OTP theft. The system 100 may include a network 102, a network device 104, a mobile device 105, a security server 106, a web server 108, and a malicious network device 110.

In some embodiments, the network 102 may be configured to communicatively couple the network device 104, the mobile device 105, the security server 106, the web server 108, and the malicious network device 110 to one another as well as to other network devices. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 3A:
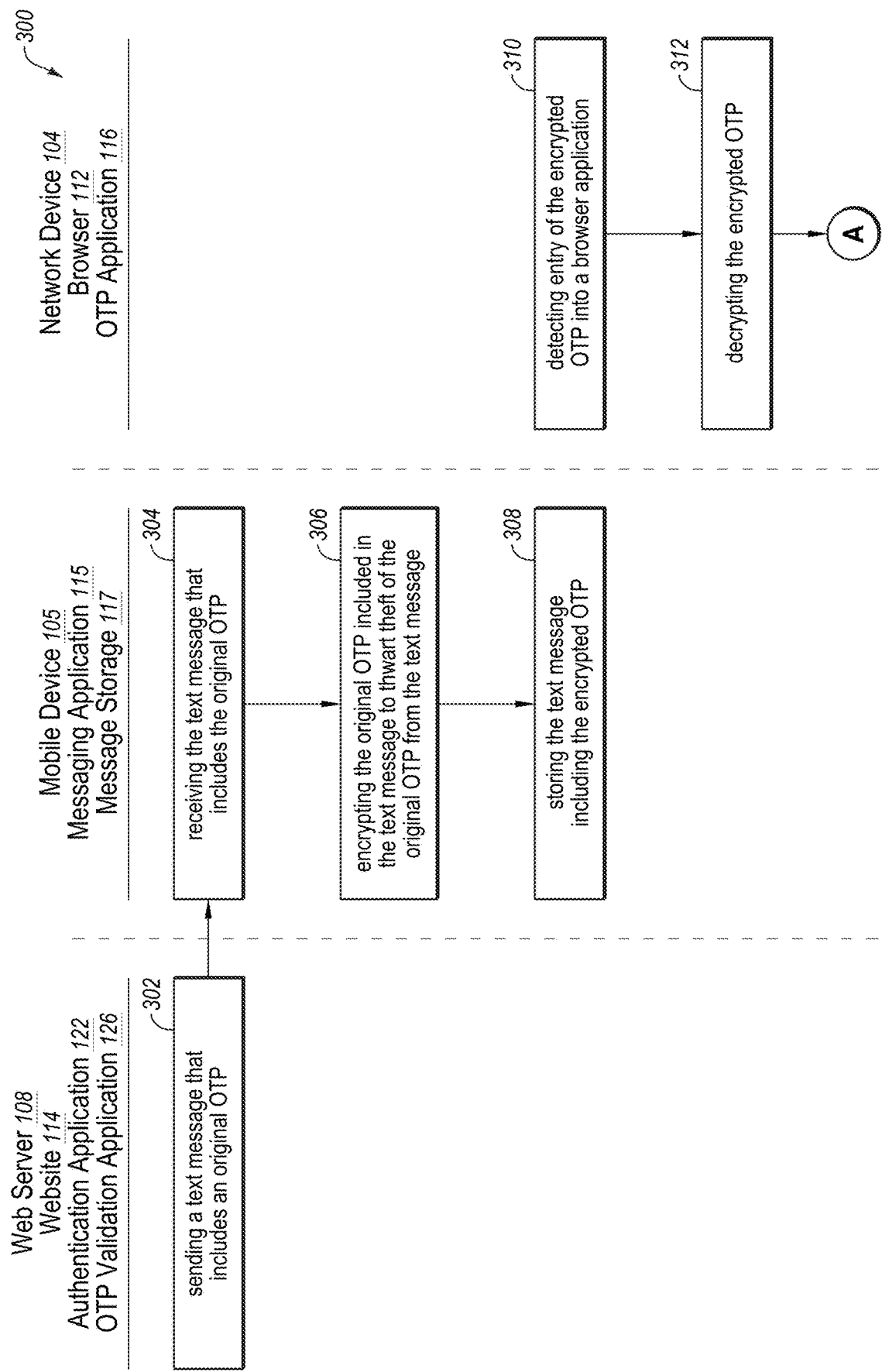
FIGS. 3A-3B are a flowchart of an example method for thwarting OTP theft.
Figure 3B:
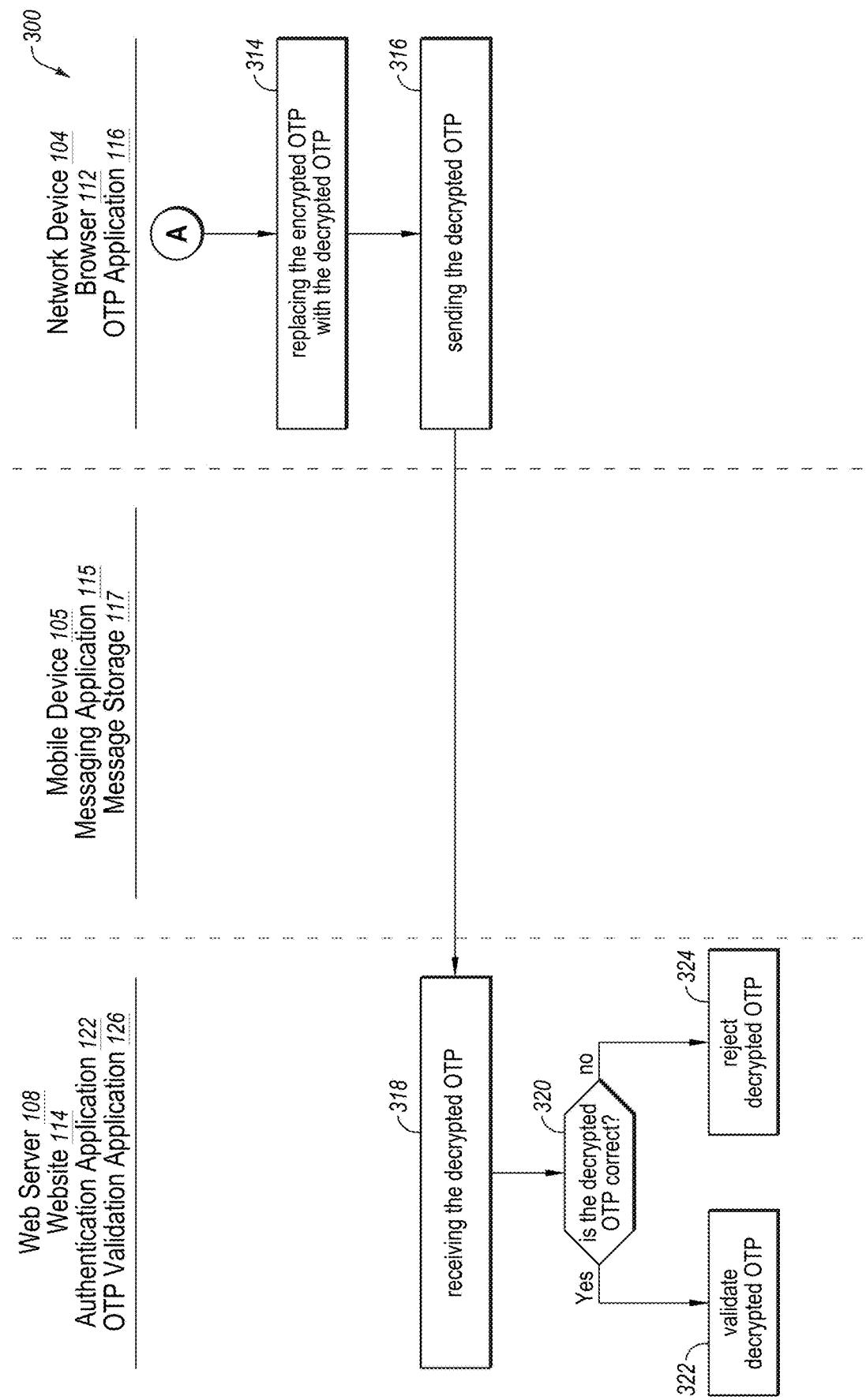
Figure 4:
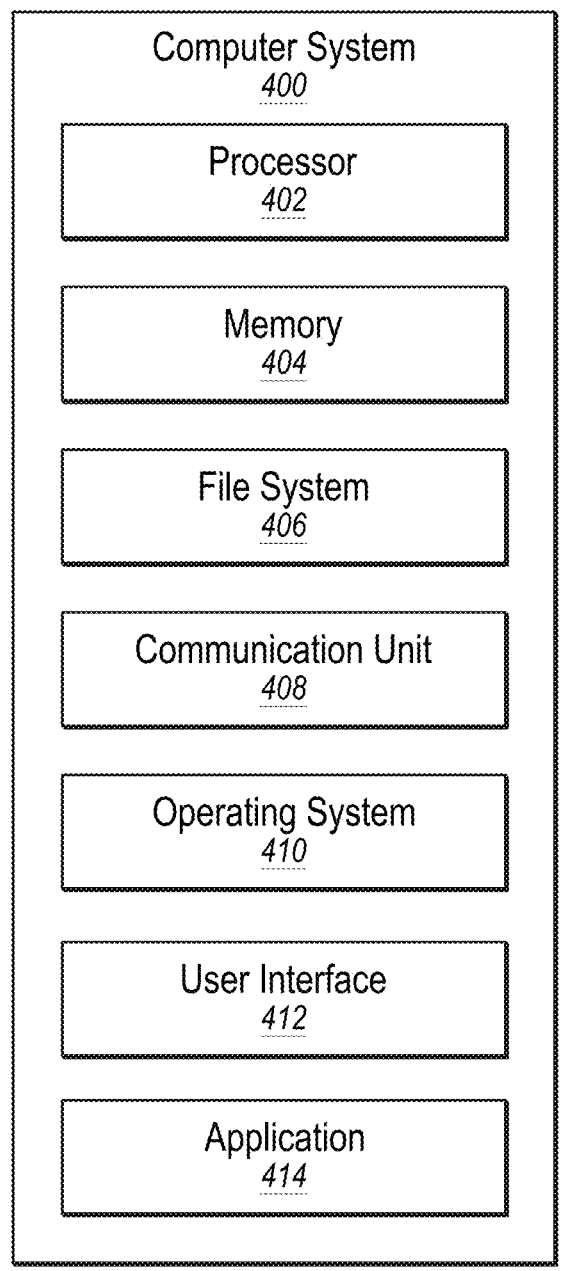
FIG. 4 illustrates an example computer system that may be employed in thwarting OTP theft.

In some embodiments, the web server 108 may be any computer system capable of communicating over the network 102 and capable of hosting a website addressable at a particular web domain, examples of which are disclosed herein in connection with the computer system 400 of FIG. 4. The web server 108 may host the website 114. The website 114 may include, or may be associated with, an authentication application 122. The authentication application 122 may generally be employed in securing access to some or all of the website 114 by only allowing properly authenticated users to access secure portions of the website 114. For example, the website 114 may be a banking website which allows users to log in to access their financial accounts and which allows users to conduct financial transactions. In this example, the authentication application 122 may be employed by the website 114 to ensure that users are only able to access their own accounts, or conduct transactions, after being properly authenticated. The authentication application 122 may include a user credentials validation application 124 and an OTP validation application 126. The user credentials validation application 124 may be employed to validate static user credentials such as a username, a password, an account number, or other user-specific information. The OTP validation application 126 may be employed to validate a single-use OTP, which may stand alone or may serve as a second level of authentication in addition to the validation of the static user credentials. In some embodiments, the authentication application 122 and/or the OTP validation application 126 may be configured to perform one or more actions of the method 300 of FIGS. 3A-3B.

In some embodiments, the malicious network device 110 may be any computer system capable of communicating over the network 102 and capable of executing a malicious application 120, examples of which are disclosed herein in connection with the computer system 400 of FIG. 4. The malicious application 120 may be configured to perform malicious actions online to steal OTPs generated by one or more websites such as the website 114. In some embodiments, the malicious application 120 may be, or may include the functionality of, one or more of a spyware, a virus, a worm, a logic bomb, a trapdoor, a Trojan horse, a Remote Admin Trojan (RAT), a malware, a mobile malicious code, a malicious font, and a rootkit. In some embodiments, the malicious network device 110 may attempt to infect the mobile device 105 with the malicious application 120 in order to steal OTPs that are contained in text messages sent to the mobile device 105.

In some embodiments, the security server 106 may be any computer system capable of communicating over the network 102 and capable of monitoring and protecting the network device 104, the mobile device 105, or the web server 108, or some combination thereof, examples of which are disclosed herein in connection with the computer system 400 of FIG. 4. In some embodiments, the security server 106 may include a security application 118 that may be configured to perform one or more actions of the method 300 of FIGS. 3A-3B.

In some embodiments, the mobile device 105 may be any computer system capable of communicating over the network 102 and capable of receiving text messages, examples of which are disclosed herein in connection with the computer system 400 of FIG. 4. The mobile device 105 may include a messaging application 115 and a message storage 117. The messaging application 115 may be a standard text messaging application and/or SMS messaging application, or may be a custom text messaging application and/or SMS messaging application. In some embodiments, the messaging application 115 may be configured as the default messaging application on the mobile device 105, such that only the messaging application 115 has full access right on incoming text messages and SMS messages before the text messages and SMS messages are stored in the message storage 117. The message storage 117 may be a text message inbox or SMS message inbox, or other text message storage. The messaging application 115 may be configured to receive text messages containing original OTPs, encrypt the original OTPs included in the text messages to thwart theft of the original OTP from the text message, and then store the text message including the encrypted OTP in the message storage 117. In this manner, the original OTP may be encrypted upon receipt by the mobile device 105 (e.g., the user's smartphone) to prevent the original OTP from being stolen by a malicious actor. Thus, by preventing theft of the original OTP by a malicious actor, the messaging application 115 may prevent the malicious actor from gaining unauthorized access to the website 114 by preventing the malicious actor from logging in to the website 114 or by preventing the malicious actor from conducting a transaction on the website 114. In some embodiments, the messaging application 115 may be configured to perform one or more actions of the method 300 of FIGS. 3A-3B.

In some embodiments, the network device 104 may be any computer system capable of communicating over the network 102 and executing a browser 112 and an OTP application 116, examples of which are disclosed herein in connection with the computer system 400 of FIG. 4. The browser 112 may be configured to communicate with and render websites (such as a website 114 hosted on the web server 108) for display to a user of the network device 104. In some embodiments, the browser 112 may be a standard off-the-shelf web browser such as, but not limited to, Google Chrome, Mozilla Firefox, Safari, Internet Explorer, or Microsoft Edge. The OTP application 116 may be a browser extension of the browser 112 (as illustrated in FIG. 1), or may be a stand-alone application (such as a mobile device app that is separate from the browser 112), or may be some combination thereof. In some embodiments, the OTP application 116 may be configured to function in connection with the browser 112 and may be configured to decrypt an encrypted OTP to make interacting with websites through the browser 112 more simple and secure for a user. For example, the OTP application 116 may automatically assist a user after the user enters an encrypted OTP into a website through the browser 112, such as an encrypted OTP used for logging in to a website, used for making a financial transaction on a website, or used for other online activity. For example, when an encrypted OTP is entered into the browser 112 of the network device 104 (e.g., the user's laptop), the OTP application 116 executing on the network device 104 may detect entry of the encrypted OTP, may decrypt the encrypted OTP to reveal the original OTP, and may replace the encrypted OTP with the original OTP prior to submission of the original OTP to the website 114. In this manner, even if the encrypted OTP received by the mobile device 105 (e.g., the user's smartphone) is stolen by a malicious actor (e.g., using voice phishing, using a malware application (app), or using shoulder surfing), the encrypted OTP can not be used to maliciously log in to the website 114, or to maliciously conduct a transaction on the website 114, unless the encrypted OTP is also entered in to the network device 104 (e.g., the user's laptop), to which the malicious actor is unlikely to have access. The OTP application 116 may also include other functionality, such as password manager functionality, which may include password storage functionality, identity theft prevention functionality, and/or monetary loss prevention functionality, and is therefore not limited simply to the decryption of encrypted OTPs. In some embodiments, the OTP application 116 may include, or may be part of, NortonLifeLock Inc.'s Mobile Security application, NortonLifeLock Inc.'s Norton Identity Safe application, NortonLifeLock Inc.'s Norton Password Manager application, NortonLifeLock Inc.'s VIP Two-Factor Authentication application, or NortonLifeLock Inc.'s LifeLock Identity Theft Protection Mobile app. Further, the OTP application 116 may also be configured to perform one or more actions of the method 300 of FIGS. 3A-3B.

Modifications, additions, or omissions may be made to the system 100 without departing from the scope of the present disclosure. In some embodiments, the system 100 may include additional components similar to the components illustrated in FIG. 1 that each may be configured similarly to the components illustrated in FIG. 1. Also, in some embodiments, the network device 104 and the mobile device 105 may be combined into a single mobile device have the functionality of both devices.

FIG. 2A illustrates an original text message 200 that contains an original OTP 202. FIG. 2B illustrates the original text message 200 of FIG. 2A after having been converted into an encrypted text message 250, with the original OTP 202 having been replaced with an encrypted OTP 252. For example, prior to allowing a user associated with the network device 104 and the mobile device 105 to access a secure portion of the website 114, the website 114 may generate the original text message 200, using the authentication application 122 or using the security application 118. The website 114 may then cause the original text message 200 to be sent to the mobile device 105. Upon receipt of the original text message 200, and prior to any malicious actor having a chance to access the original OTP 202 contained in the original text message 200 (e.g., using voice phishing, using a malware application (app), or using shoulder surfing), the messaging application 115 may convert the original text message 200 of FIG. 2A into the encrypted text message 250 of FIG. 2B.

One difference between the original text message 200 and the encrypted text message 250 may be that the original OTP 202 may have been encrypted to become the encrypted OTP 252. Other portions of the text message may also be encrypted and/or changed during the process of converting the original text message 200 into the encrypted text message 250 in order, for example, to hide other sensitive information or personally identifiable information (PII) contained in the original text message 200. The encrypted OTP 252 may be generated using a format preserving encryption algorithm. The format preserving encryption algorithm may preserve certain formatting characteristics of the original OTP 202, such as preserving the type of characters in the OTP (e.g., if the original OTP has all numeric characters, all alpha characters, all punctuation characters, or all Chinese characters, etc., these types of characters will be used in the encrypted OTP), preserving the language of the OTP (e.g., if the original OTP is an English word, then the encrypted OTP will be an English word), or preserving the number of characters (e.g., if the original OTP has six characters, then the encrypted OTP will have six characters). Using a format preserving encryption algorithm may enable the encrypted OTP 252 to be accepted in a form field of the website 114 that has restrictions on the format of the OTP that can be entered. In the embodiment disclosed in FIGS. 2A-2B, the original OTP 202 of "683850" has been encrypted to become the encrypted OTP 252 of "847386" using a format preserving encryption algorithm that ensures that the encrypted OTP 252 will have the same number of characters as the original OTP 202 (e.g., six characters).

In this manner, the original OTP 202 may be encrypted upon receipt by the mobile device 105 (e.g., the user's smartphone) to prevent the original OTP 202 from being stolen by a malicious actor. Thus, by preventing theft of the original OTP 202 by a malicious actor, the messaging application 115 may prevent the malicious actor from gaining unauthorized access to the website 114 by preventing the malicious actor from logging in to the website or by preventing the malicious actor from conducting a transaction on the website.

FIGS. 3A-3B are a flowchart of an example method 300 for thwarting OTP theft. The method 300 may be performed, in some embodiments, by a device or system, such as by the website 114, the authentication application 122, or the OTP validation application 126 of the web server 108, the messaging application of the mobile device 105, or the browser 112 or the OTP application 116 of the network device 104, or by some combination thereof, or by some other device or system. In these and other embodiments, the method 300 may be performed by one or more processors based on one or more computer-readable instructions stored on one or more non-transitory computer-readable media. The method 300 will now be described in connection with FIGS. 1, 2A, 2B, and 3A-3B.

The method 300 may include, at action 302, sending and, at action 304, receiving a text message that includes an original OTP. In some embodiments, the text message may be a Short Message Service (SMS) text message. For example, the authentication application 122 may send, at action 302, and the messaging application 115 may receive, at action 304, the original text message 200, which may be an SMS text message, and that may include the original OTP 202 of "683850." In some embodiments, the messaging application 115 may be a custom messaging application configured to handle all incoming text messages received at the mobile device 105.

The method 300 may include, at action 306, encrypting the original OTP included in the text message to thwart the theft of the original OTP. In some embodiments, the encrypting of the original OTP may include encrypting the original OTP with a format preserving encryption algorithm. In these embodiments, the format preserving encryption algorithm may be configured to cause the encrypted OTP to have the same number of characters as the original OTP. For example, the messaging application 115 may encrypt, at action 306, the original text message 200 that includes the original OTP 202 of "683850" to generate the encrypted text message 250 that includes the encrypted OTP 252 of "847386" to thwart theft of the original OTP 202 by a malicious actor. The encrypting of the original OTP 202 may be performed using a format preserving encryption algorithm in order to, for example, cause the encrypted OTP 252 to have the same number of characters as the original OTP 202 (e.g., six characters).

In some embodiments, the encrypting, at action 306, of the original OTP may include generating, by the messaging application, an asymmetric key pair including a private key and a public key, storing, at the mobile device, the private key, sending, from the messaging application to the OTP plugin application, the public key, generating, by the OTP plugin application, an original session key, encrypting, by the OTP plugin application, the original session key using the public key, sending, from the OTP plugin application to the messaging application, the encrypted session key, decrypting, by the messaging application, the encrypted session key using the stored private key to reveal the original session key, and encrypting, by the messaging application, the original OTP using the original session key. In these embodiments, the public key and the encrypted session key may be sent via a first server that is different from a second server that hosts the website. For example, the messaging application 115 may generate an asymmetric key pair including a private key and a public key, may store the private key at the mobile device 105, and may send the public key to the OTP application 116. These actions may be performed once, and then the public key and the private key may be used repeatedly. Later, the OTP application 116 may generate an original session key, encrypt the original session key using the public key, and send the encrypted session key to the to the messaging application 115. These actions by the OTP application 116 determining that a user has loaded a login form of the website 114 in the browser 112, and may be repeated each time that the user loads a login form of any website in the browser 112. Then, the messaging application 115 may decrypt the encrypted session key using the stored private key to reveal the original session key, and encrypt the original OTP 202 using the original session key. In these embodiments, the public key and the encrypted session key may be sent via the security server 106 instead of from the web server 108 that hosts the website 114.

The method 300 may include, at action 308, storing the text message including the encrypted OTP. For example, the messaging application 115 may store, at action 308, the encrypted text message 250 that includes the encrypted OTP 252 of "847386" in the message storage 117, which may be a text message inbox.

The method 300 may include, at action 310, detecting entry of the encrypted OTP into a browser application. For example, the OTP application 116 may detect, at action 310, the entry of the encrypted OTP 252 of "847386" into the browser 112.

The method 300 may include, at action 312, decrypting the encrypted OTP. For example, the OTP application 116 may decrypt, at action 312, the encrypted OTP 252 of "847386" to reveal the original OTP 202 of "683850."

The method 300 may include, at action 314, replacing the encrypted OTP with the decrypted OTP. In some embodiments, the replacing of the encrypted OTP with the decrypted OTP may include automatically filling in a form field of the website, into which the encrypted OTP was entered, with the decrypted OTP. For example, the OTP application 116 may replace, at action 314, the encrypted OTP 252 of "847386" with the decrypted original OTP 202 of "683850" in a form field of the website 114 into which the encrypted OTP 252 was entered in the browser 112, prior to submission of the original OTP 202 of "683850" to the website 114.

The method 300 may include, at action 316, sending and, at action 318, receiving the decrypted OTP. For example, the messaging application 115 may send, at action 316, and the authentication application 122 may receive, at action 318, the decrypted original OTP 202 of "683850."

The method 300 may include, at action 320, determining whether the decrypted OTP is correct. If so (yes at action 320), the method 300 may include, at action 322, validating the decrypted OTP. If not (no at action 320), the method 300 may include, at action 324, rejecting the decrypted OTP. For example, the OTP validation application 126 may determine, at action 320, whether the decrypted OTP received at action 318 is the correct OTP, such as by determining whether the decrypted OTP matches the original OTP 202 sent at action 302. If so, the OTP validation application 126 may validate, at action 322, the decrypted original OTP 202 and allow a user of the browser 112 to access appropriate secure areas of the website 114. If not, the OTP validation application 126 may reject, at action 324, the decrypted OTP and prevent access to secure areas of the website 114.

In some embodiments, the method 300 may result in the thwarting of theft of the original OTP 202 by a malicious actor after the original OTP is sent from the website 114 to the mobile device 105 in the original text message 200. In particular, the method 300 may cause the messaging application 115 to encrypt the original OTP 202 upon receipt by the mobile device 105 (e.g., the user's smartphone) to prevent the original OTP 202 from being stolen by a malicious actor. Thus, by preventing theft of the original OTP 202 by a malicious actor, the method 300 may cause the messaging application 115 to prevent the malicious actor from gaining unauthorized access to the website 114 by preventing the malicious actor from logging in to the website 114 or by preventing the malicious actor from conducting a transaction on the website 114.

Although the actions of the method 300 are illustrated in FIGS. 3A-3B as discrete actions, various actions may be divided into additional actions, combined into fewer actions, reordered, expanded, or eliminated, depending on the desired implementation. For example, in some embodiments, actions 304 and 306 may be performed without performing other actions of the method 300. Further, in some embodiments, actions 304, 306, and 308 may be performed without performing other actions of the method 300. Also, in some embodiments, actions 310, 312, and 314 may be performed without performing other actions of the method 300. Further, in some embodiments, actions 304, 306, 308, 310, 312, and 314 may be performed without performing other actions of the method 300. Further, in some embodiments, one or more of the actions of the method 300 (e.g., actions 310, 312, and 314), or additional actions, may be performed by the security application 118 instead of the OTP application 116. Also, in some embodiments, the OTP in the method 300 may be an OTP used for any purpose, and is not limited to an OTP used in connection with websites.

Further, it is understood that the method 300 may improve the functioning of a network device itself or a server itself, and may improve the technical field of malicious online activity detection and prevention. For example, the functioning of the network device 104, the mobile device 105, and/or the web server 108 of FIG. 1 may itself be improved by the method 300, by encrypting an original OTP sent from the website 114 to the mobile device 105 in a text message to prevent theft of the original OTP 202 by a malicious actor. In this manner, the method 300 may prevent the malicious actor using the mobile device 105 or the network device 104 to gain unauthorized access to the website 114, by preventing the malicious actor from logging in to the website 114 or by preventing the malicious actor from conducting a transaction on the website 114.

FIG. 4 illustrates an example computer system 400 that may be employed in thwarting potentially malicious online activity. In some embodiments, the computer system 400 may be part of any of the systems or devices described in this disclosure. For example, the computer system 400 may be part of any of the network device 104, the mobile device 105, the security server 106, the web server 108, or the malicious network device 110 of FIG. 1.

The computer system 400 may include a processor 402, a memory 404, a file system 406, a communication unit 408, an operating system 410, a user interface 412, and an application 414, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 402 may include any suitable special-purpose or general-purpose computer, computing entity, or processing device including various computer hardware or software applications and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more actions of the method 300 of FIGS. 3A-3B.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more actions of the method 300 of FIGS. 3A-3B. These computer-executable instructions may be included, for example, in the operating system 410, or in one or more applications, such as the browser 112, the OTP application 116, the security application 118, the malicious application 120, the authentication application 122, the user credentials validation application 124, the OTP validation application 126, or some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a Wi-Fi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The application 414 may be one or more computer-readable instructions stored on one or more non-transitory computer-readable media, such as the memory 404 or the file system 406, that, when executed by the processor 402, is configured to perform one or more actions of the method 300 of FIGS. 3A-3B. In some embodiments, the application 414 may be part of the operating system 410 or may be part of an application of the computer system 400, or may be some combination thereof. In some embodiments, the application 414 may function as the browser 112, the OTP application 116, the security application 118, the malicious application 120, the authentication application 122, the user credentials validation application 124, or the OTP validation application 126 of FIG. 1.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general-purpose computer (e.g., the processor 402 of FIG. 4) including various computer hardware or software applications, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for thwarting one-time password (OTP) theft, at least a portion of the method being performed by a mobile device comprising at least one processor, the method comprising:
   receiving, at a messaging application executing on the mobile device, a text message from a website that includes an original OTP;
   encrypting, by the messaging application, the original OTP included in the text message to thwart theft of the original OTP from the text message;
   storing, by the messaging application, the text message including the encrypted OTP;
   detecting, at an OTP plugin application, entry of the encrypted OTP into the website loaded into a browser application;
   decrypting, by the OTP plugin application, the encrypted OTP to reveal the original OTP; and
   replacing, by the OTP plugin application, the encrypted OTP with the original OTP prior to submission of the original OTP to the website.

2. The method of claim 1, wherein the messaging application is a custom messaging application configured to handle all incoming text messages received at the mobile device.

3. The method of claim 1, wherein the encrypting of the original OTP comprises encrypting the original OTP with a format preserving encryption algorithm.

4. The method of claim 3, wherein the format preserving encryption algorithm is configured to cause the encrypted OTP to have the same number of characters as the original OTP.

5. The method of claim 1, wherein the encrypting of the original OTP comprises:
   generating, by the messaging application, an asymmetric key pair including a private key and a public key;
   storing, at the mobile device, the private key;
   sending, from the messaging application to the OTP plugin application, the public key;
   generating, by the OTP plugin application, an original session key;
   encrypting, by the OTP plugin application, the original session key using the public key;
   sending, from the OTP plugin application to the messaging application, the encrypted session key;
   decrypting, by the messaging application, the encrypted session key using the stored private key to reveal the original session key; and encrypting, by the messaging application, the original OTP using the original session key.

6. The method of claim 5, wherein the public key and the encrypted session key are sent via a first server that is different from a second server that hosts the website.

7. The method of claim 1, wherein the replacing of the encrypted OTP with the original OTP comprises automatically filling in a form field of the website, into which the encrypted OTP was entered, with the original OTP.

8. A computer-implemented method for thwarting one-time password (OTP) theft, at least a portion of the method being performed by a mobile device comprising at least one processor, the method comprising:
   receiving, at a messaging application executing on the mobile device, a text message from a website that includes an original OTP;
   upon receipt of the text message at the messaging application, automatically encrypting, by the messaging application, the original OTP included in the text message, with a format preserving encryption algorithm, to thwart theft of the original OTP from the text message;
   storing, by the messaging application, the text message including the encrypted OTP; and
   displaying, by the messaging application, the text message with the encrypted OTP being visible.

9. The method of claim 8, wherein the messaging application is a custom messaging application configured to handle all incoming text messages received at the mobile device.

10. The method of claim 8, wherein the format preserving encryption algorithm is configured to cause the encrypted OTP to have the same number of characters as the original OTP.

11. The method of claim 8, wherein the encrypting of the original OTP comprises:
   generating, by the messaging application, an asymmetric key pair including a private key and a public key;
   storing, at the mobile device, the private key;
   sharing, by the messaging application, the public key;
   receiving, at the messaging application, an encrypted session key that was encrypted using the public key;
   decrypting, by the messaging application, the encrypted session key using the stored private key to reveal an original session key; and
   encrypting, by the messaging application, the original OTP using the original session key.

12. The method of claim 11, wherein the public key and the encrypted session key are sent via a first server that is different from a second server that hosts the website.

13. The method of claim 8, wherein the text message is a Short Message Service (SMS) text message.

14. A computer-implemented method for thwarting one-time password (OTP) theft, at least a portion of the method being performed by a network device comprising at least one processor, the method comprising:
   detecting, at an OTP plugin application executing on the network device, entry of an encrypted OTP into a website loaded into a browser application executing on the network device;
   decrypting, by the OTP plugin application, the encrypted OTP to reveal an original OTP; and
   replacing, by the OTP plugin application, the encrypted OTP with the original OTP prior to submission of the original OTP to the website.

15. The method of claim 14, wherein the encrypted OTP was encrypted with a format preserving encryption algorithm.

16. The method of claim 15, wherein the format preserving encryption algorithm is configured to cause the encrypted OTP to have the same number of characters as the original OTP.

17. The method of claim 14, wherein the encrypted OTP was encrypted using a session key that was generated by the OTP plugin application.

18. The method of claim 14, wherein the replacing of the encrypted OTP with the original OTP comprises automatically filling in a form field of the website, into which the encrypted OTP was entered, with the original OTP.

19. The method of claim 14, wherein the network device is a mobile device at which a text message from the website that includes the original OTP is received.

* * * * *